[19] 
US007603446B2

(12) United States Patent  (10) Patent No.: US 7,603,446 B2
Brisse  (45) Date of Patent: Oct. 13, 2009

(54) SYSTEM AND METHOD FOR CONFIGURING A STORAGE AREA NETWORK

(75) Inventor: Matthew P. Brisse, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/943,387

(22) Filed: Nov. 20, 2007

(65) Prior Publication Data

US 2008/0065748 A1 Mar. 13, 2008

Related U.S. Application Data

(63) Continuation of application No. 09/956,349, filed on Sep. 19, 2001.

(51) Int. Cl.
*G06F 15/177* (2006.01)
(52) U.S. Cl. ....................................... 709/220
(58) Field of Classification Search ......... 709/217–225; 711/117, 147
See application file for complete search history.

(56) References Cited

U.S. PATENT DOCUMENTS

| | | | |
|---|---|---|---|
| 5,155,847 A | 10/1992 | Kirouac et al. | 395/600 |
| 5,276,789 A | 1/1994 | Besaw et al. | 395/140 |
| 5,394,522 A | 2/1995 | Sanchez-Frank et al. | 395/159 |
| 5,680,326 A | 10/1997 | Russ et al. | 364/514 |
| 5,742,829 A | 4/1998 | Davis et al. | 395/712 |
| 5,745,568 A | 4/1998 | O'Conner et al. | 380/4 |
| 5,802,286 A | 9/1998 | Dere et al. | 395/200.5 |
| 5,821,937 A | 10/1998 | Tonelli et al. | 345/356 |
| 5,894,571 A | 4/1999 | O'Conner | 395/652 |
| 5,963,743 A | 10/1999 | Amberg et al. | 395/712 |
| 5,983,316 A | 11/1999 | Norwood | 711/112 |
| 5,991,543 A | 11/1999 | Amberg et al. | 395/712 |
| 5,995,757 A | 11/1999 | Amberg et al. | 395/712 |

(Continued)

FOREIGN PATENT DOCUMENTS

EP 1115225 7/2001

(Continued)

OTHER PUBLICATIONS

PRNewsFoto. "SANavigator Inc. to Demo San Management Software at NAB2001", Apr. 16, 2001, 2 pages.*

(Continued)

*Primary Examiner*—George C Neurauter, Jr.
(74) *Attorney, Agent, or Firm*—Baker Botts L.L.P.

(57) ABSTRACT

A system for configuring a storage area network (SAN) may include a plurality of selectable SAN elements, and a design module operable to graphically configure selected SAN elements, and a validation engine operable to dynamically validate the configuration of the selected SAN elements. The validation engine may include an element related validation module and a group related validation module. The element related validation module may be configured to validate element to element relationships of connected SAN elements in the configuration of selected SAN elements. The group related validation module may be configured to validate a group of SAN elements in the configuration of selected SAN elements. The validation modules may be arranged such that during validation of the configuration of selected SAN elements, the element related validation module is employed before the group related validation module.

20 Claims, 5 Drawing Sheets

U.S. PATENT DOCUMENTS

| | | | | |
|---|---|---|---|---|
| RE36,444 | E | 12/1999 | Sanchez-Frank et al. | 345/349 |
| 6,009,466 | A | 12/1999 | Axberg et al. | 709/220 |
| 6,058,426 | A | 5/2000 | Godwin et al. | 709/229 |
| 6,108,309 | A | 8/2000 | Cohoe et al. | 370/241 |
| 6,148,414 | A | 11/2000 | Brown et al. | 714/9 |
| 6,195,097 | B1 | 2/2001 | Shrader et al. | 345/356 |
| 6,199,112 | B1 | 3/2001 | Wilson | 709/227 |
| 6,208,955 | B1 | 3/2001 | Provan et al. | 703/20 |
| 6,212,606 | B1 | 4/2001 | Dimitroff | 711/147 |
| 6,229,540 | B1 | 5/2001 | Tonelli et al. | 345/356 |
| 6,247,126 | B1 | 6/2001 | Beelitz et al. | 713/1 |
| 6,279,155 | B1 | 8/2001 | Amberg et al. | 717/11 |
| 6,279,156 | B1 | 8/2001 | Amberg et al. | 717/11 |
| 6,282,711 | B1 | 8/2001 | Halpern et al. | 717/11 |
| 6,285,967 | B1 | 9/2001 | Rajan et al. | 702/188 |
| 6,327,706 | B1 | 12/2001 | Amberg et al. | 717/11 |
| 6,421,723 | B1 | 7/2002 | Tawil | 709/224 |
| 6,430,614 | B1 | 8/2002 | Cucchiara | 709/223 |
| 6,597,956 | B1 | 7/2003 | Aziz et al. | 700/3 |
| 6,636,239 | B1 | 10/2003 | Arquié et al. | 345/736 |
| 6,650,342 | B1 | 11/2003 | Lim | 345/736 |
| 6,671,776 | B1 | 12/2003 | DeKoning | 711/114 |
| 6,697,087 | B1 | 2/2004 | Kelly | 345/735 |
| 6,718,392 | B1 | 4/2004 | Krause | 709/238 |
| 6,738,818 | B1 | 5/2004 | Shah | 709/228 |
| 6,765,919 | B1 | 7/2004 | Banks et al. | 370/401 |
| 6,779,016 | B1 | 8/2004 | Aziz et al. | 709/201 |
| 6,799,255 | B1 | 9/2004 | Blumenau et al. | 711/152 |
| 6,833,850 | B1 | 12/2004 | Arquie et al. | 345/734 |
| 6,836,750 | B2 | 12/2004 | Wong et al. | 702/186 |
| 6,839,747 | B1 | 1/2005 | Blumenau et al. | 709/223 |
| 6,845,387 | B1 | 1/2005 | Prestas et al. | 709/203 |
| 6,854,387 | B2 | 2/2005 | Lee et al. | 101/211 |
| 6,950,871 | B1 | 9/2005 | Honma et al. | 709/226 |
| 6,952,208 | B1 | 10/2005 | Arquie et al. | 345/440 |
| 6,990,660 | B2 | 1/2006 | Moshir et al. | 717/171 |
| 7,133,906 | B2 | 11/2006 | Price et al. | 709/220 |
| 7,146,412 | B2 | 12/2006 | Turnbull | 709/220 |
| 7,152,109 | B2 | 12/2006 | Suorsa et al. | 709/226 |
| 7,171,458 | B2 | 1/2007 | Brown et al. | 709/220 |
| 7,171,660 | B2 | 1/2007 | McCaleb et al. | 717/171 |
| 7,194,526 | B2 | 3/2007 | Kanemitsu | 709/220 |
| 2002/0002704 | A1 | 1/2002 | Davis et al. | 717/11 |
| 2002/0029319 | A1 | 3/2002 | Robbins et al. | 711/114 |
| 2002/0052941 | A1 | 5/2002 | Patterson | 709/223 |
| 2002/0100036 | A1 | 7/2002 | Moshir et al. | 717/173 |
| 2002/0143942 | A1 | 10/2002 | Li et al. | 709/225 |
| 2002/0156828 | A1 | 10/2002 | Ishizaki et al. | 709/201 |
| 2002/0174211 | A1* | 11/2002 | Ishizaki et al. | 709/223 |
| 2002/0176417 | A1 | 11/2002 | Wu et al. | 370/389 |
| 2002/0176433 | A1 | 11/2002 | Zhu et al. | 370/422 |
| 2002/0176434 | A1 | 11/2002 | Yu et al. | 370/422 |
| 2002/0194340 | A1 | 12/2002 | Ebstyne et al. | 709/226 |
| 2003/0055932 | A1 | 3/2003 | Brisse | 709/223 |
| 2003/0078946 | A1 | 4/2003 | Costello et al. | 707/201 |
| 2003/0179748 | A1* | 9/2003 | George et al. | 370/389 |
| 2005/0027754 | A1 | 2/2005 | Gajjar et al. | 707/200 |
| 2007/0011283 | A1 | 1/2007 | Brown et al. | 709/220 |
| 2007/0027968 | A1 | 2/2007 | Price et al. | 709/220 |

FOREIGN PATENT DOCUMENTS

| | | |
|---|---|---|
| JP | 06-187396 | 7/1994 |
| WO | 0101241 | 1/2001 |
| WO | 0114987 | 3/2001 |

OTHER PUBLICATIONS

SANavigator, Inc. "Sanavigator's Steve Hindman to Present 'Optimizing SAN Performance' at SAN 2001 Conference", May 30, 2001, 3 pages.*

TrueSAN Networks, Inc. "TrueSAN Networks Lauches SANdesigner Internet Software Platform for Quick and Easy Online SAN Configuration", Mar. 22, 2000, 2 pages.*

Pending U.S. Appl. No. 09/330,725 entitled "Method and System for Establishing a Storage Area Network Configuration" filed by Tawil ; assigned to Dell USA, L.P., filed Jun. 11, 1999.

Dell Computer Corporation, *INFOBrief*, "PowerVault SAN Configuration Tool Release 4.05", ESG/SSG Worldwide Marketing, pp. 1-9, May 2001.

Vicom Systems, *SV SAN Builder*, "SV SAN Builder enables efficient configuration and utilization of virtualized network storage", Vicom SVE Software Suite, 2 pages, May 2001.

Website for Windows 2000, *Storage Admin;* "SAN-Sizing Tools" at internet <http://www.storageadmin.com/Articles/Index.cfm?ARticleID=19856>, printed Jul. 20, 2001.

Website for Internet Week, *Reviews;* Drawing Pictures of Your Storage at internet <http://www.internetweek.com/reviews00/rev100200-5.htm>, printed Jul. 20, 2001.

Website for TrueSAN Networks, "SAN Designer" at internet <http://www.truesan.com/products/resources/sandesigner/sandesigner.htm>, printed Aug. 15, 2001.

Website for IBM, *xSeries and Netfinity/San sizing tool;* "Solution Sizing Tool" at internet <http://www.developer.ibm.com/welcome/myvc.pl?mvcid=overview&packageid=999san&,,,>, printed Aug. 30, 2001.

Website for DataCore, *Press Room,* "DataCore Launches Interactive ROI Tools for Storage Area Network Expanding Professional Services Program Helps Users Cut Through t Fast-Changing SAN Marketplace" at internet <128.121.236.245/pressroom/pr_010108.asp>, printed Aug. 30, 2001.

Website for Dell Computer Corporation, Brisse, Matthew, "SAN Configuration Tool for Dell SANs" at internet <http://www.dell.com/us/en/esg/topices/power_ps4q00-brisse.htm>, Issue 4, 2000, printed Sep. 4, 2001.

Website for Dell Computer Corporation, Echols, Jeff, "The New, Improved PowerVault SAN Configuration Tool" at internet <http://www.dell.com/us/en/esg/topics/power_ps2q01-echols.htm>, Issue 2, 2001, printed Sep. 4, 2001.

Translation of Office Action for German Application No. 10243595.2, pp. 8, Sep. 19, 2002.

Wilson, Steven, "Managing a Fibre Channel Storage Area Network", Storage Network Management Working Group for Fibre Channel (SNMWG-FC), 12 pages.

Translation of Third Office Action for CN 02142405.5 No. 10243595.2, pp. 4, May 26, 2008.

* cited by examiner

FIG. 4

```
View Report - C:\Documents and Settings\jeff_echols\Desktop\bundle.sto
File
```

SAN Configuration Report

All elements in SAN
Summary

| Device ID — 106 | 108 — Total Quantity | Existing Quantity | New Quantity |
|---|---|---|---|
| QLA2200(66MHz) | 6 | 6 | 0 |
| QLA2200(33MHz) | 2 | 2  110 | 0  112 |
| NDELL | 2 | 0 | 2 |
| PE1550 | 1 | 0 | 1 |
| PE6450 | 1 | 0 | 1 |
| PV51F | 2 | 0 | 2 |
| PV660F | 1 | 0 | 1 |
| Copper GBIC | 10 | 0 | 10 |
| Disks in PV660F/630F | 10 | 0 | 10 |

NOTE:
1. This table assumes the user already has all the devices that are marked as pre-existing — 114
2. Switches by default do not have any GBICs at their ports Cables in SAN   120  122  124  126  116  128

| Cable Type — 118 | Color | Length | Total Quantity | Existing Quantity | New Quantity |
|---|---|---|---|---|---|
| Copper HSSDC to DB-9 | RED | 1.5m | 2 | 0 | 2 |
| Copper HSSDC to HSSDC | BLUE | 24inch | 8 | 0 | 8 |

Server Configuration

| Device ID | Name | Devices connected to | | Service |
|---|---|---|---|---|
| NDELL(1) | 132 — | OS: WIN2000    104 | | S2 |
| | | Tape BackUp S/W: None | | |
| 130 | | Description: | | |
| | 134 — | HBA #1: QLA2200(66MHz) is connected to PV51F(1) at Port 4 | | |
| | | GBIC: Copper | | |
| | | Cable type: Copper HSSDC to HSSDC | | |
| | | Cable length: 24inch | | |
| | 134 — | HBA #2: QLA2200(66MHz) is connected to PV51F(2) at Port 4 | | |
| | | GBIC: Copper | | |
| 130 | | Cable type: Copper HSSDC to HSSDC | | |
| | | Cable length: 24inch | | |
| NDELL(2) | | OS: WIN2000 | | S2 |

SYSTEM AND METHOD FOR CONFIGURING A STORAGE AREA NETWORK

RELATED APPLICATION

This application is a Continuation of U.S. patent application Ser. No. 09/956,349 filed Sep. 19, 2001, entitled "System And Method For Configuring A Storage Area Network," the contents of which are incorporated herein in their entirety by reference.

TECHNICAL FIELD

The following disclosure relates in general to the field of electronic systems and more particularly to a system and method for configuring a Storage Area Network.

BACKGROUND

A noticeable dilemma in the Storage Area Network (SAN) industry is the disparity between the benefits of SAN technology and the complexity of SAN configuration, deployment and operation. The Information Technology (IT) departments that operate SANs are often hampered by complex SAN topologies and configurations—leading to increased management costs. Additionally, IT departments face challenges due to the scarcity of highly trained personnel as well as the need for rapid deployment of SANs. Additionally, the ongoing operation of a SAN is effected by IT environments that often experience human resources turnover due to industry wide competition. As a result, when an employee departs from an organization, that organization often loses an important source of technical knowledge.

An organization considering implementing a SAN faces a number of challenges. These challenges may include: designing the SAN, communicating the SAN design to interested parties, installing the SAN and managing changes to the SAN after installation. The first- and often the most complex-step for deploying a SAN is determining a proper design and configuration to meet a user's needs. The complexities associated with SANs often revolve around how a SAN is incorporated within a storage system, how the SAN works with individual storage components, and how to design the overall topology of the SAN. SANs are often designed with pencil and paper. For more complex SAN configurations, such a technique is inadequate, inviting errors and miscalculations. Further, users are often faced with the daunting task of determining which components are needed for a new or modified SAN and how to configure these components so they will work with existing components and cabling.

Once a SAN configuration has been determined, those requirements as well as the benefits of the proposed configuration typically need to be communicated to others. This communication is needed to ensure that the procurement, management and implementation of the SAN can proceed efficiently. However, this type of communication is frequently lacking, hindering the operation and ongoing management of the SAN.

The initial installation and deployment of a SAN is also often hindered by poor communication. This can lead to problems in verifying that all necessary elements have been received and that the elements of the SAN are correctly installed. The installation is further complicated by the common practice of having a separate group of professionals install the SAN. Yet another problem is that a deficient understanding of the configuration of the SAN often leads to extensive trouble shooting an reworking to solve problems that arrive during the ongoing operation of the SAN.

SUMMARY

Therefore a need has arisen for an improved system and method for designing and configuring a SAN.

A further need has arisen for a system and method for communicating SAN configuration information to facilitate the installation of a SAN.

A further need has arisen for a system for generating and communicating SAN topology information for operation and maintenance of a SAN.

In accordance with teachings of the present disclosure, a system and method are described for configuring a SAN. In one aspect, the system includes multiple SAN elements that a user may select as well as a design module in which the selected SAN elements may be graphically configured. The system also includes a validation engine which dynamically validates the configuration of the selected SAN elements. More particularly, the system may include a report engine operable to provide a configuration report of the selected SAN configuration. The report engine may produce a SAN topology report, a SAN inventory report and a SAN cable configuration report. These reports may be used as dynamic installation documentation instructing the user how to install and configure the SAN per the SAN configuration topology.

In another aspect of the present disclosure a method for designing a SAN is disclosed. The method includes selecting one or more SAN elements and arranging the selected SAN elements in a design module. The method further includes validating the arrangement of the selected SAN elements. More particularly the method may include producing a report of the selected configuration of SAN elements.

In one embodiment the system provides a GUI-based tool that graphically displays selected SAN elements as if sketched on a piece of paper. The tool offers a drag-and-drop approach to topology design that allows users to add components to the SAN with real-time rule validation when a new component is selected. The selected and validated SAN configuration may then be printed or electronically communicated. This method and system promotes smooth and effective communication between the SAN designer, future users, consultants (such as outside consultants tasked with installing a SAN), and sales representatives.

The present disclosure includes a number of important technical advantages. One technical advantage is providing a design module for configuring selected SAN elements and providing a validation engine for validating the selected SAN configuration. The design module and validation engine provide an improved system and method for designing and configuring a SAN.

Another technical advantage is including a report engine capable of producing a topology report, an inventory report and a cable configuration report. The reporting engine provides a convenient platform for communicating SAN configuration and topology information in support of the installation, maintenance, and ongoing operation of a SAN.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a SAN configuration report according to the present disclosure:

DETAILED DESCRIPTION

Preferred embodiments and their advantages are best understood by reference to FIGS. 1 through 6, wherein like numbers are used to indicate like and corresponding parts.

Figure 1:
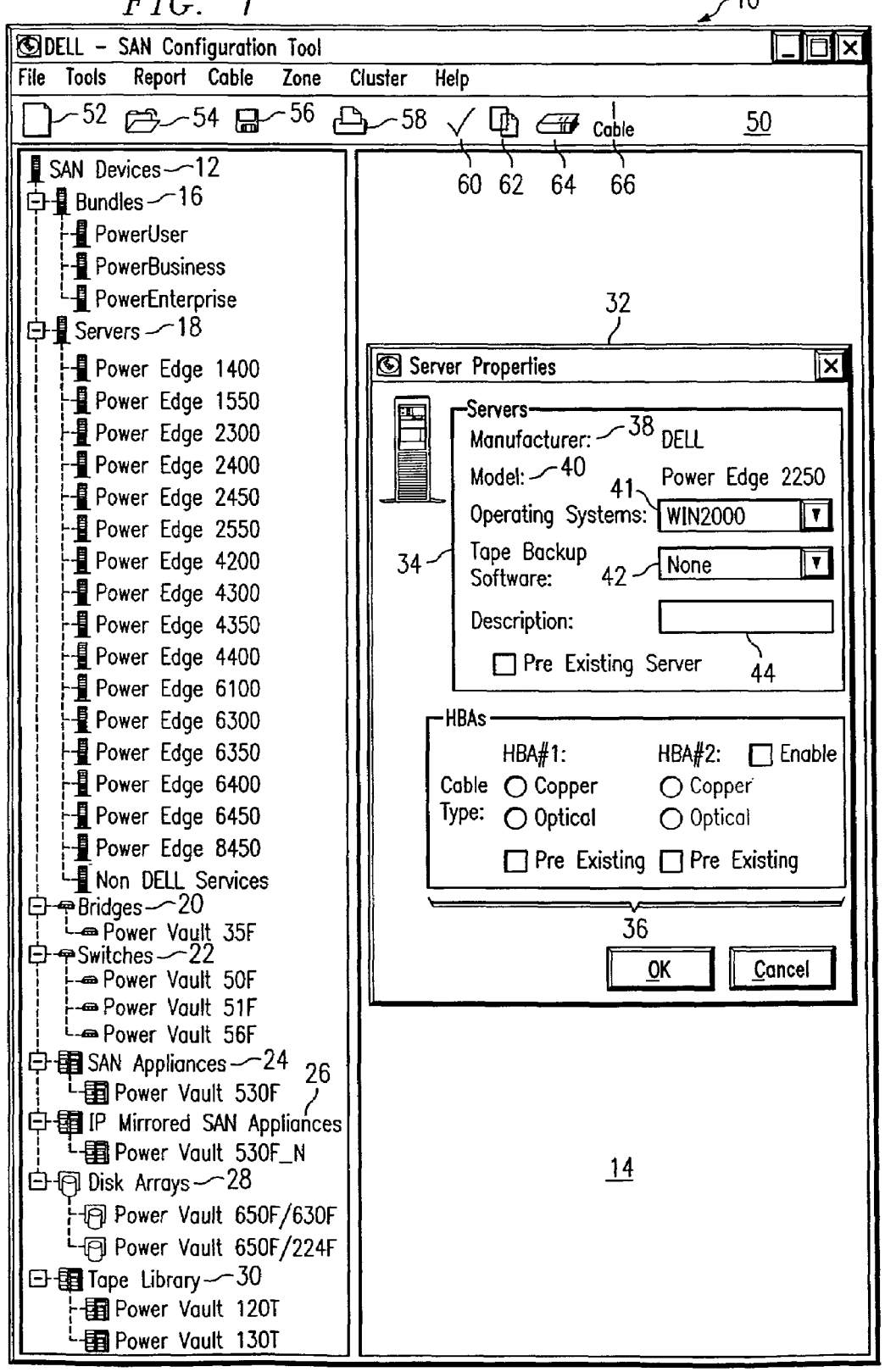
FIG. 1 is a user interface of a SAN configuration tool according to the present disclosure.

Now referring to FIG. 1 which shows a user interface of a SAN configuration tool, indicated generally at 10, according to the present disclosure. SAN configuration tool 10 includes a plurality of selectable SAN elements 12 and design module 14. Design module 14 is operable to graphically receive selected SAN elements 12 to be graphically configured and connected into a storage area network (SAN). SAN elements 12 may be selected using an interface tool such as a mouse or keyboard (not expressly shown). In the present embodiment selectable SAN elements 12 include bundles 16, servers 18, bridges 20, switches 22, SAN appliances 24, IP mirrored SAN appliances 26, disk arrays 28 and tape libraries 30. Alternatively SAN elements 12 may include additional SAN elements or network devices suitable to be included within a SAN.

Bundles 16 may include pre-configured SANs that may be selectively modified or adapted by a user. Bundles 16 provide a good beginning point for a user as they begin to design their own SAN. Servers 18 may include selectable server elements that are listed according to manufacturer and model. Bridges 20, switches 22, SAN application appliances 24, IP mirrored SAN appliances 26, disk arrays 28 and tape libraries 30 may also be listed according to manufacturer and model.

In one embodiment the design module may be preferably divided into three sections: a server section, a storage section, and an interconnect section. For example, servers 18 are placed in the server section because the SAN Configuration Tool will not allow servers 18 to be placed in the storage or interconnect sections. Similarly, storage components are be placed in the storage section, and interconnect components such as switches 22, bridges 20 and SAN appliances 24 are placed in the interconnect sections. This ensures a consistent and clean look-and-feel for the overall SAN topology within design module 14.

Figure 5:
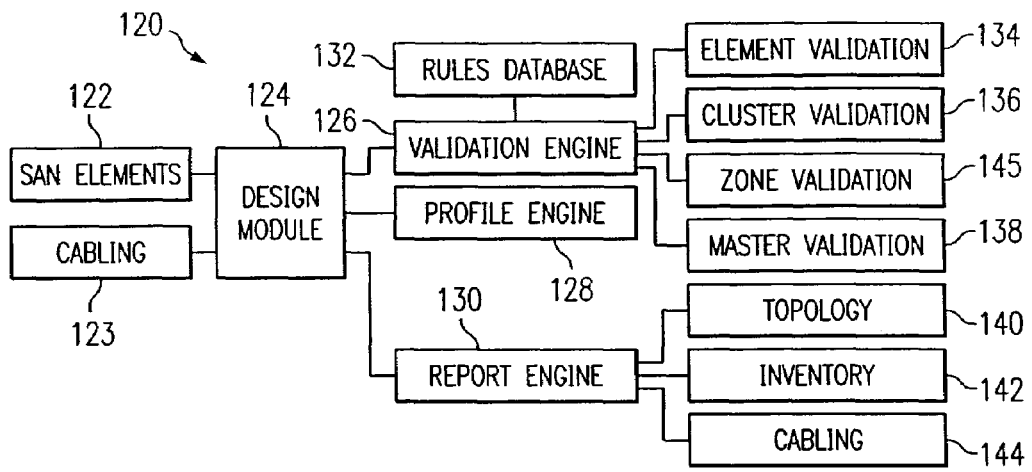
FIG. 5 is a diagram of a SAN configuration tool according to the present disclosure.
Figure 6:
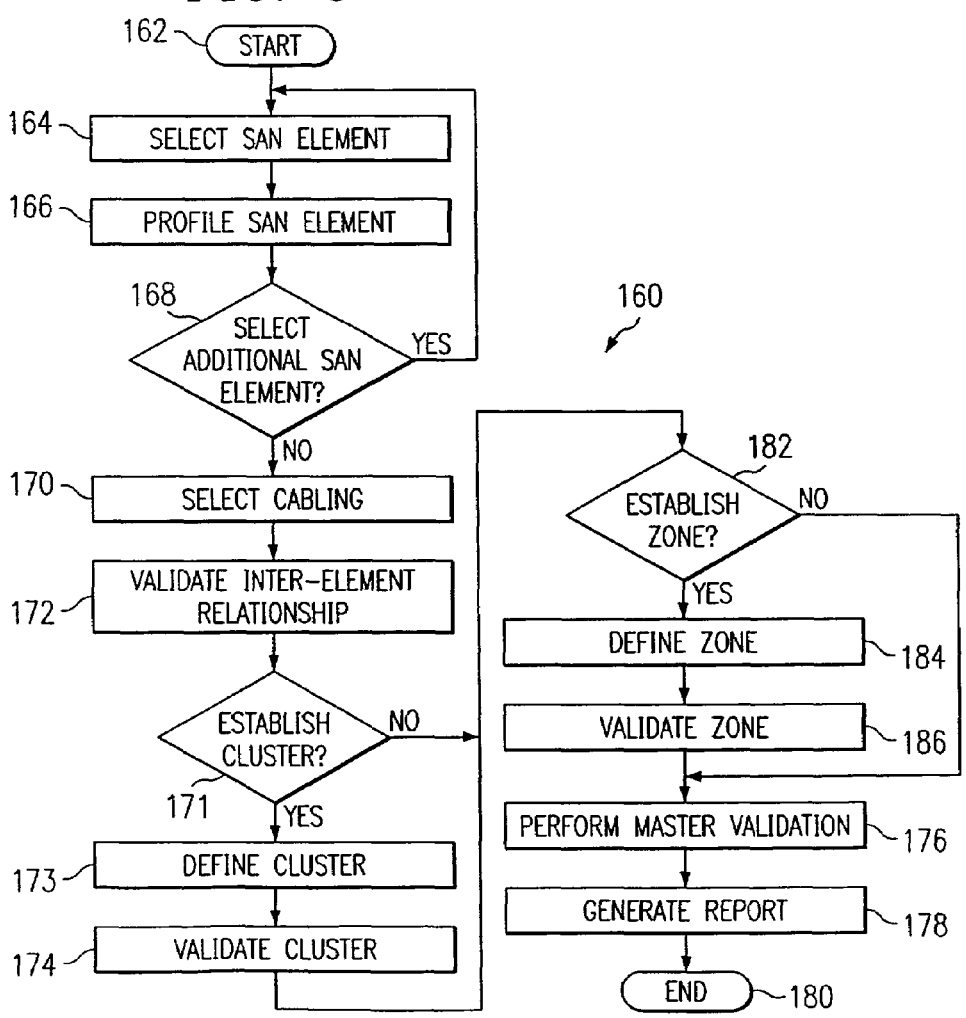
FIG. 6 is a flow diagram of the operation of a SAN configuration tool according to the present disclosure.

In the present embodiment after a SAN element 12 is selected SAN element 12 is preferably profiled using profile utility 32 which may also be referred to as a profile wizard and is preferably operated by profile engine described in FIG. 5 herein. Profile utility 32 generally includes a field for entering and displaying element characteristics 34 as well as a field for displaying host bus adapter (HBA) 36 for the network element in question.

Fields included within element characteristics 34 include manufacturer field 38, model field 40, operating system field 41 for listing the operating system running on the selected element, tape backup system, field 42 and SAN element description field 44. Manufacturer field 38 and model field 40 are automatically generated according to manufacturer and model of the selected element. Operating system field 41, tape backup system field 42, and element description field 42 are preferably selected by a user. Particularly element description field 44 is preferably provided to allow a user to name a selected element or otherwise give a selected SAN element a unique identifier. Gathering this profile information may enable system designers to easily communicate the configuration to sales representatives and consultants later in the design process.

In a particular embodiment, profile engine may query a user for a network transport type such as a copper or optical HBA network transfer type.

In the present embodiment SAN configuration tool user interface 10 includes toolbar 50. Toolbar 50 preferably includes new document button 52, open file button 54, save file button 56 and print button 58. New document button 52 allows a user to open a new document. Open file button 54 allows a user to access an existing document for review and revision. Save file button 56 allows a user to save a design document. Print button 58 allows a user to print a design document to an associated printer (not expressly shown). Further toolbar 50 may also include a validation button 60. Validation button 60 allows a user to validate an entire SAN configuration displayed within design module taking into consideration clustering and zoning relationships as they relate to each component within the SAN 14.

Save button 62 allows a user to save the report in suitable format such as .rtf format. Documentation button 64 allows a user to access on line documentation information and cable button 66 allows the user to create a cable object to connect SAN elements. Cable button 66 preferably allows a user to select and place SAN component 12 in design module 14 and then select another SAN component 12 in design module 14, thereby connecting the SAN components with the appropriate cable. A cable wizard may preferably be activated instructing the user to input particular aspects such as: connection type such as a port on a switch, type of SAN Fabric such as 1 GB or 2 GB (gigabit) fabric, and cable length.

Figure 2:
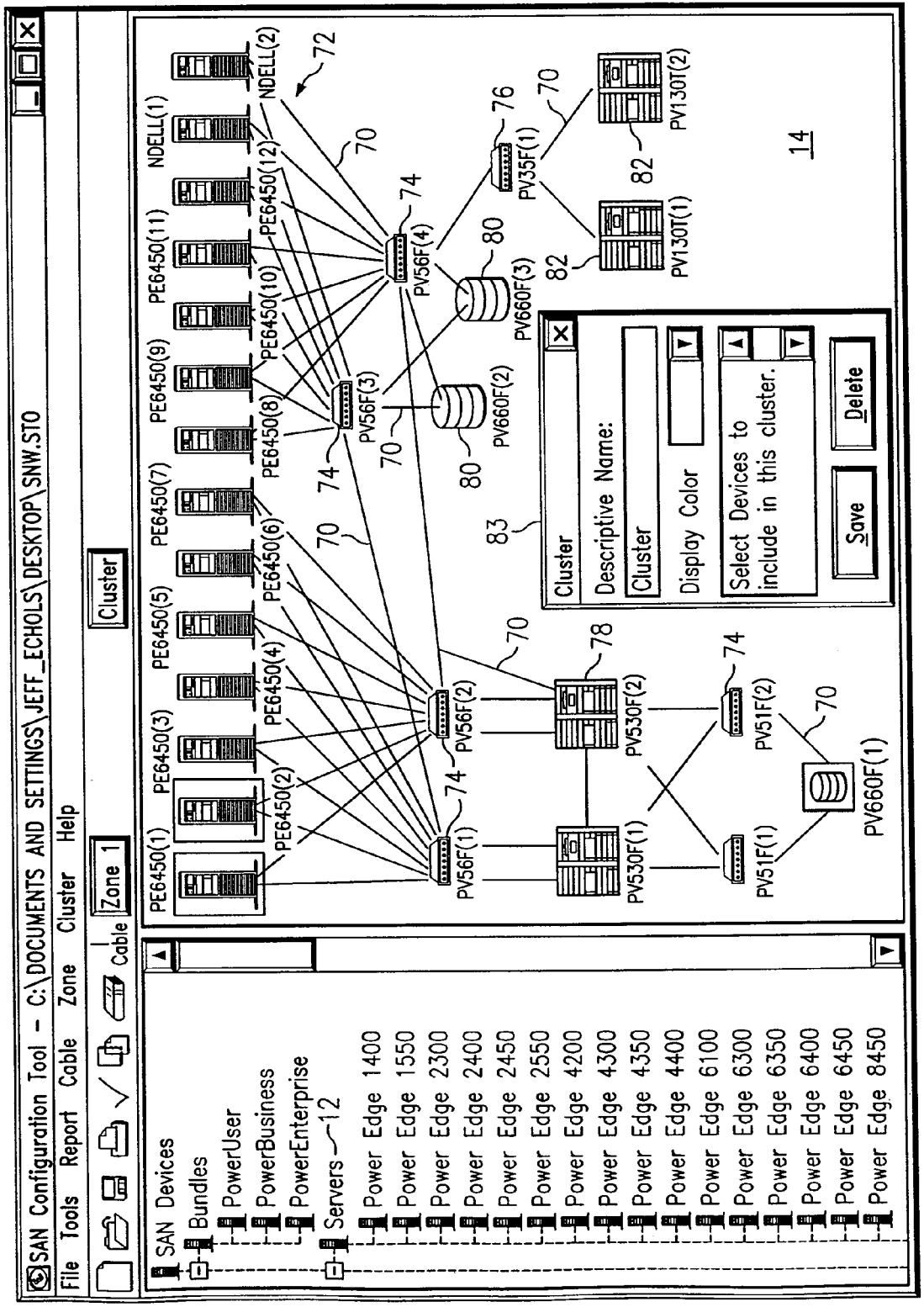
FIG. 2 is a user interface of a configuration tool according to the present disclosure including a graphic display of a selected SAN configuration and a cluster profile tool.

Referring now to FIG. 2 user interface 10 of a configuration tool according to the present disclosure including a selected SAN configuration, zone profile and a cluster profile utility is shown. Configuration tool user interface 10 includes selectable SAN devices 12 which may be graphically selected in design module 14 using a drag-and-drop type technique. In the present embodiment, the selected SAN configuration displayed in design module 14 includes selected servers 72 and selected switches 74. Selected servers 72 are preferably connected to selected switches 74 by cabling 70. The selected SAN configuration also includes bridges 76, selected SAN appliances 78, selected disk arrays 80 and selected tape libraries 82, all connected by cabling 70.

A cluster is a grouping of multiple servers in a way that allows them to appear to be a single unit to client computers on a network. Clustering is frequently used to increase network capacity, provide live backup if one server in the cluster fails, and to improve data security. Cluster profile 83 is preferably provided to identify and obtain profile information for clusters within the selected SAN configuration. Cluster profile 83 includes a cluster name, a display color for indicating the selected cluster as well as a listing of the selected SAN elements that are included within a selected and configured cluster.

A zone is a grouping of multiple SAN components in a way that allows them to appear to be in a single Fabric within the SAN infrastructure. Zoning is a frequently used technique used to separate active and passive paths in order to coordinate path fail-over techniques used for high availability. A zone profile similar to a cluster profile may also be included to identify and select SAN components with a zone.

Figure 3:
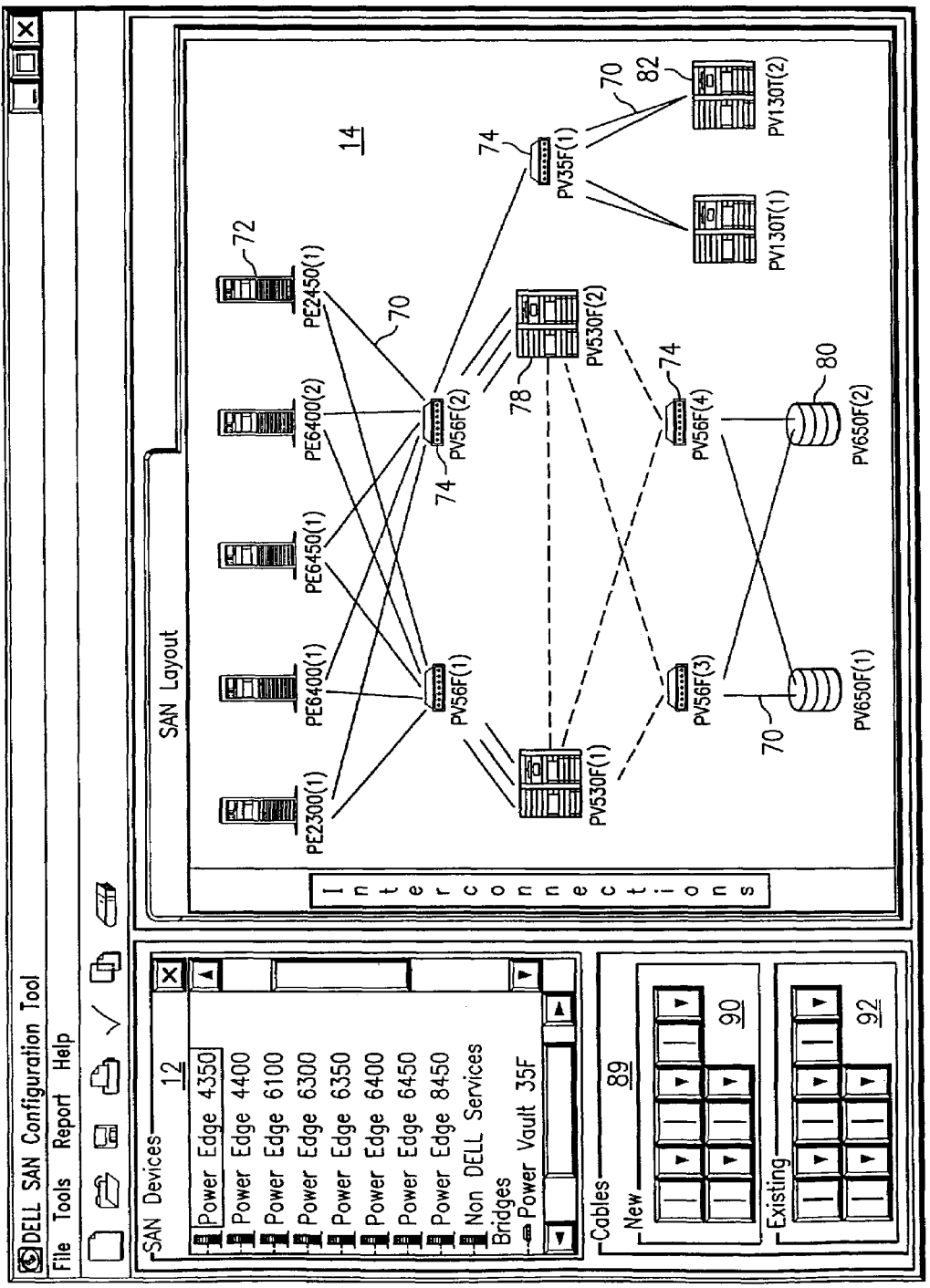
FIG. 3 is a user interface showing a SAN configuration tool according to the present disclosure including cabling tools.

FIG. 3 is a SAN configuration tool user interface according to the present disclosure. SAN configuration tool user interface 10 includes selectable SAN elements 12 and design module 14. In the present embodiment design module 14 includes a selected SAN configuration including servers 72, switches 74, SAN appliances 78, disk arrays 80 and tape libraries 82 interconnected by cabling 70.

Configuration tool user interface 10 also includes selectable cable elements 89. Selectable cable elements 89 include new cable elements 90 and existing cable elements 92. New cable elements 90 are preferably selectable cable elements for connecting SAN elements 12 within a selected SAN configuration that a user or designer does not currently have. Existing cable elements 92 (and denoted with dashed lines for ease of use) include selectable cable elements that a user or a designer currently has access to. Providing both new cable elements 90 and existing cable elements 92 allows a user or a procurement professional to utilize the cabling the user already has access to and to assess the new cabling the user will need to procure in order to build the contemplated SAN design.

Referring now to FIG. 4, a SAN configuration report according the present disclosure is indicated generally at 100. SAN configuration report 100 includes a SAN element inventory report 102 and a cable configuration report 104. SAN configuration report 100 further includes SAN cabling inventory report 116.

SAN element inventory report 102 includes device summary 106 listing devices contained in the selected SAN configuration. SAN element inventory report 102 further includes total quantity 108 of each type of SAN element within the selected SAN configuration. Total quantity 108 is further existing quantity 110 and new quantity 112 of each type of SAN element. The listing of existing quantity 110 and new quantity 112 provides the designer of a SAN with valuable information regarding the necessary SAN elements required to install and deploy a contemplated SAN configuration. SAN inventory report 102 allows users such as sales personnel and installation personnel to determine whether all new equipment has been obtained and to further determine which existing equipment is to be used.

SAN cabling inventory report 118 includes a summary of the type of cables within a selected SAN configuration. The color 120 of the cables within the SAN, the length 122 of the cables within the SAN and the total quantity 124 of the cables within the selected SAN configuration are preferably included in SAN configuration report 100. The cables are preferably listed according to existing quantity 126 of the cables and the quantity of new cables 128 required for the contemplated SAN configuration.

Cable configuration report 104 provides a description of cabling specific to each element 130 for a particular SAN configuration. Cable configuration report 104 further includes a listing of connected devices 132 specific to each SAN element 130. Cable configuration report 104 also includes a description of the connection between each listed SAN element 130 and the elements attached thereto.

FIG. 5 is a diagram of a SAN configuration tool indicated generally at 120, according to the present disclosure. SAN configuration tool 120 includes selectable elements 122 operatively connected to design module 124. Selectable elements 122 may be selected by a user and graphically placed into design module 124 using a drag-and-drop type method.

Selectable cabling 123 is also operatively connected to design module 124. Selectable cabling 123 may be user selected to connect selected SAN elements 122 within design module 124. Design module 124 is further operably connected to validation engine 126 profiling engine 128 and report engine 130. Additionally, validation engine 126 is connected to rules database 132. In the present embodiment, validation engine 126 includes element validation module 134, cluster validation module 136, zone validation module 145 and master validation module 138.

Report engine 130 further includes topology report generator 140, inventory report generator 142 and cable configuration report generator 144. Cable configuration report generator 144 and topology report generator may preferably generate installation documentation detailing the cabling associated with each component with the SAN. Such installation documentation preferably includes a detailed explanation of the cabling associated with each port of each SAN component. Inventory report generator 142 may preferably generate a report listing profile information for each SAN component. In a particular embodiment, this inventory report may include a description of the service level associated with each SAN component.

Report engine 130 further includes topology report generator 140, inventory report generator 142 and cable configuration report generator 144. Cable configuration report generator 144 and topology report generator may preferably generate installation documentation detailing the cabling associated with each component with the SAN. Such installation documentation preferably includes a detailed explanation of the cabling associated with each port of each SAN component. Inventory report generator 142 may preferably generate a report listing profile information for each SAN component. In a particular embodiment, this inventory report may include a description of the service level associated with each SAN component.

In operation, elements are selected from selectable elements 122 and placed into design module 124. As each selected SAN element is selected and placed within design module 124, profile engine 128 preferably generates a user interface such as a window that requires a user to input profile information about the selected SAN element. Profile engine 128 preferably obtains a portion of the profile information using the characteristics of the selected element such as the model and manufacturer of the selected component. Additionally, profile engine may automatically input additional input related to the type of SAN element selected and stored within a memory (not expressly shown) accessible to profile engine 128.

Profile engine further obtains SAN element profile information via user input such as the type of operating system running on the selected element and providing a unique identifier for the SAN element. In a preferred embodiment, profile engine 128 may compare user provided information about selected SAN elements 122 with stored information regarding SAN element characteristics. If the comparison reveals an inconsistency, profile engine 128 preferably generates an error message. For example, if a user inputs a storage capacity for a Disk Array that beyond the known capacity for the model of Disk Array selected, profile engine 128 preferably generates an appropriate error message. Additionally, if a user inputs a unique identifier for an element that is identical to another element identifier, profile engine 128 preferably generates an appropriate error message.

Selectable elements are then preferably connected with cabling 123 in design module 124. After selected elements 122 are connected using cabling 123, element validation module 134 of validation engine 126 validates the element to element relationship of the connected elements. When a cable is selected the user clicks and drags the cable connecting two elements together. The selected cabling and the components to which it is attached may preferably be validated.

The SAN Configuration Tool may interactively alert the user that a component can or cannot be cabled in the proposed way. These alerts or error messages occurring at the beginning of the process can eliminate re-engineering during installation and operation. In a preferred embodiment, if an error is detected, both an error message as well as a recommendation as to the resolution to the problem is displayed.

After sufficient elements have been placed in the design module the user may select to establish clusters within design module 124. In one embodiment, a user may select a cluster dialog box and select a color for a cluster to aid in distinguishing the cluster multiple clusters in a SAN. The user may then select elements automatically adding it to the cluster color group. Following the identification of elements within a cluster, validation engine 126 may then validate selected clusters within design module 124 via cluster module 136 and the use of cluster rules contained in rules database 132. Cluster validation module preferably validates that the relationship between the cluster servers, switches, storage and the fabric complies to clustering rules contained in database 132.

Additionally, a user may select a zone dialog box and select a color to help a user identify and distinguish multiple zones in a SAN. A user may then select SAN elements, thereby adding those SAN elements to the zone color group. After elements within a zone are identified, zone validation module 145 preferably validates that the relationship between the zone components complies with zoning rules.

After a SAN configuration has been established within design module 124, validation engine 126 preferably employs master validation module 138 to validate the selected SAN configuration. Master validation module 124 is preferably operable to determine whether the SAN configuration complies with rules contained in rules database 132. In a preferred embodiment, master validation module 138 is activated by selecting a button on a tool bar (as shown in FIG. 1). Rules contained in rule database 132 and programmed into validation engine 126 preferably include basic core rules related to the SAN in general that are object independent as well as the rules specific to each object. Also, additional rules pertaining to the interconnect relationship, fabric rules, clustering rules, zoning rules, and a master rule set for the entire SAN design are preferably included.

In one embodiment, the master validation includes a first step of validating each component against a component rule list. This is to ensure that the components themselves are configured correctly. Next, component connection validation occurs. This step verifies that each component is connected correctly to upstream and downstream components. It also validates that the cables used to connect the components are of the correct type, length and end connector types for each component. Next, Clustering rules are validated. This validation procedure cross-references the clustering rules and verifies that the components connected to the cluster servers are valid under clustering rules. Finally, zones are validated against the zone rules. This step validates that the zones are correctly configured with the proper relationships between clustered servers, components and component dependencies. Now referring to FIG. 6 a flow diagram of the use of a SAN configuration tool, indicated generally at 160, is shown. The use of a SAN configuration tool begins at 162 in which a SAN element is selected 164. The SAN element is then profiled 166 using a profiling engine (as shown in FIG. 5). Next, it is then determined whether or not any additional SAN elements are desired to be selected 168. If an additional element is desired to be selected then an additional element is selected 164. However if the selection of elements is complete, cabling is selected 170. After selecting and establishing the type of cabling connecting SAN elements the relationship between the cabled elements is validated 172. In one particular embodiment this step is performed by an element validation module (as shown in FIG. 5).

After cabled elements have been validated then a user may choose to establish clusters within the SAN configuration 171. Clusters may then be defined 173 and thereafter validated 174. In a particular embodiment, the cluster validation step may be facilitated by a cluster validation module (as shown in FIG. 5). It should be noted that a user may elect not to establish a cluster within a give SAN, and that multiple clusters may be established. After the one or more clusters have been defined and validated the SAN may preferably be zoned 182 to separate out clustered servers or separate host based operating systems or backup configurations. Users may preferably define zones 184 by selecting a zoning utility, selecting a color to uniquely identify the zone, and selecting the SAN elements that are to be associated with the zone. Real-time validation of the zone may preferably be performed when the SAN element is selected 186. If the SAN element is determined to be invalid, it will not allow the object to be applied to the zone. After one or more zones have been created, the SAN configuration as a whole may be validated 176. This step may also be referred to as master validation step and, in a preferred embodiment, may be performed by a master validation module (as shown in FIG. 5). After the master validation of a SAN configuration 176, a report may be generated. In a preferred embodiment, the generated report may preferably include a topology report, a cable configuration report, and a SAN inventory report.

In one particular embodiment, these SAN configurations topologies may be saved to disk with the file extension .sto. These .sto files typically feature an optimized format that generally will not exceed 30 KB. This feature preferably reduces the file size to facilitate sharing of information regarding the SAN configuration over a network such as the Internet or via electronic mail. After the SAN has been validated, a report can be generated in a suitable format such as .rtf format.

Although the disclosed embodiments have been described in detail, it should be understood that various changes, substitutions and alterations can be made to the embodiments without departing from their spirit and scope.

What is claimed is:

1. A computer system for configuring a storage area network (SAN), comprising:
   a plurality of selectable SAN elements;
   one or more processors; and
   instructions embodied in computer-readable media and executable by the one or more processors, the instructions including:
   a design module operable to graphically configure selected SAN elements; and
   a validation engine operable to dynamically validate the configuration of the selected SAN elements, wherein the validation engine includes:
   an element related validation module for validating element to element relationships of connected SAN elements in the configuration of selected SAN elements; and
   a group related validation module for validating a group of SAN elements in the configuration of selected SAN elements, the validation modules being arranged such that during validation of the configuration of selected SAN elements, the element related validation module is employed before the group related validation module.

2. A computer system according to claim 1, in which the group related validation module includes a cluster validation module and a zone validation module.

3. A computer system according claim 1, further comprising the validation engine operable to provide dynamic validation of the selected SAN configuration.

4. The computer system according to claim 1, further comprising a database including validation rules, the database being accessible by the validation engine for operating the validation modules of the validation engine.

5. A computer system according to claim 4, wherein the validation rules include object independent and object dependent rules.

6. A computer system according to claim 1, further comprising a report engine operable to provide a configuration report of the selected SAN configuration.

7. A computer system according to claim 6, wherein the configuration report includes installation documentation for the selected SAN elements.

8. A computer system according to claim 6, wherein the configuration report includes:
 a SAN topology report;
 a SAN inventory report; and
 a SAN cable configuration report.

9. A computer system according to claim 1, wherein the selectable SAN elements include:
 at least one server element;
 at least one switch element; and
 at least one storage element.

10. A computer system according to claim 1, wherein the selectable SAN elements further comprise a plurality of selectable connector elements for selectively connecting other SAN elements.

11. A computer system according to claim 1, further comprising a profile engine for profiling the characteristics of each selected SAN element.

12. A method for designing a storage area network (SAN), comprising:
 selecting a plurality of SAN elements;
 arranging the selected SAN elements using a design module; and
 validating the arrangement of selected SAN elements, the validation including:
  performing element related validation to validate element to element relationships of connected SAN elements in the arrangement of selected SAN elements; and
  after performing the element related validation, performing group related validation to validate a group of SAN elements in the arrangement of selected SAN elements.

13. A method according to claim 12, further comprising producing a configuration report of the selected arrangement of SAN elements.

14. A method according to claim 12, further comprising communicating the validated arrangement of SAN elements across a network.

15. A method according to claim 12, wherein the group related validation comprises cluster validation followed by zone validation.

16. A method according to claim 12, wherein the validation includes a master validation following the element related validation and group related validation.

17. A method according to claim 12, wherein the validation is performed according to validation rules stored in a database.

18. A method according to claim 17, wherein the validation rules include object independent and object dependent rules.

19. A system for dynamically validating a user-selected graphical configuration of selectable storage area network (SAN) elements, the system embodied in computer-readable media and executable by the one or more processors, the system comprising:
 an element related validation module for validating element to element relationships of connected SAN elements in the user-selected graphical configuration; and
 a group related validation module for validating a group of SAN elements in the user-selected graphical configuration;
 wherein during validation of the user-selected graphical configuration, the element related validation module is employed before the group related validation module.

20. A system according to claim 19, further including a master validation module configured to perform a master validation following the element related validation and group related validation.

* * * * *